United States Patent [19]

Trent

[11] Patent Number: 5,126,577

[45] Date of Patent: Jun. 30, 1992

[54] INFRARED TARGET PLATE HANDLING APPARATUS WITH IMPROVED THERMAL CONTROL

[75] Inventor: Randall L. Trent, Goleta, Calif.

[73] Assignee: Electro-Optical Industries, Inc., Santa Barbara, Calif.

[21] Appl. No.: 721,995

[22] Filed: Jun. 27, 1991

[51] Int. Cl.[5] .......................................... G01M 11/02
[52] U.S. Cl. .............................. 250/495.1; 250/504 R; 273/348.1
[58] Field of Search ...................... 250/495.1, 504 R; 273/348.1

[56] References Cited

U.S. PATENT DOCUMENTS

| | | | |
|---|---|---|---|
| 3,597,618 | 8/1971 | Jordan et al. | 250/495.1 |
| 4,263,515 | 4/1981 | Runciman | 250/504 R |
| 4,647,783 | 3/1987 | Verona | 250/495.1 |
| 4,706,963 | 11/1987 | Geuss | 273/348.1 |

Primary Examiner—Jack I. Berman
Attorney, Agent, or Firm—Ladas & Parry

[57] ABSTRACT

A target placement apparatus having the facility to select targets with apertures of various sizes and monitor their temperature by pressing them against a framework. The apparatus is adapted to place targets at the objective plane in an infrared sensitivity or calibrator. The apparatus comprises a magazine-like storage means for storing a plurality of target plates, preferably soaking at ambient temperature, and a mechanical arrangement for removing a selecting one of the target plates from the storage means and precisely placing it at the objective plane. The arrangement for removing a selected target plate from storage and placing it in the proper position includes a movable mechanical arm having a simplified wrist action which positively and reliably operates to remove a selected target plate from the storage means and swing the target plate into an indexed position within a window area of a surrounding high mass framework.

25 Claims, 3 Drawing Sheets

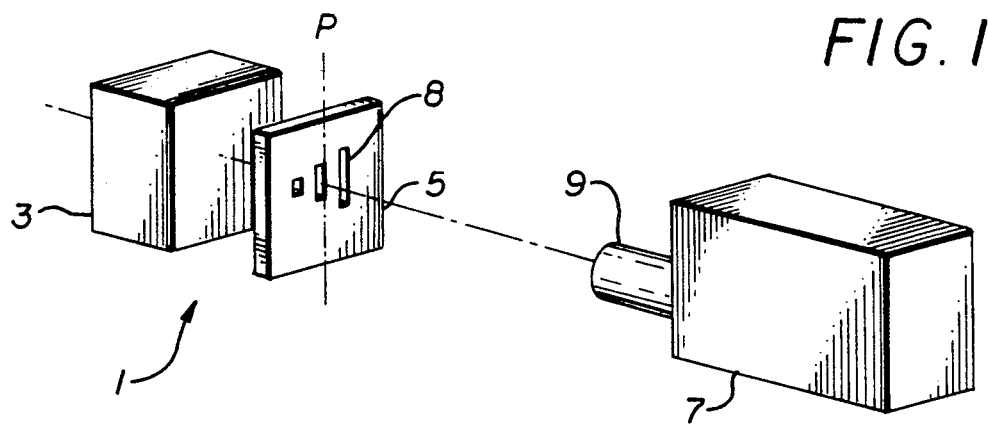
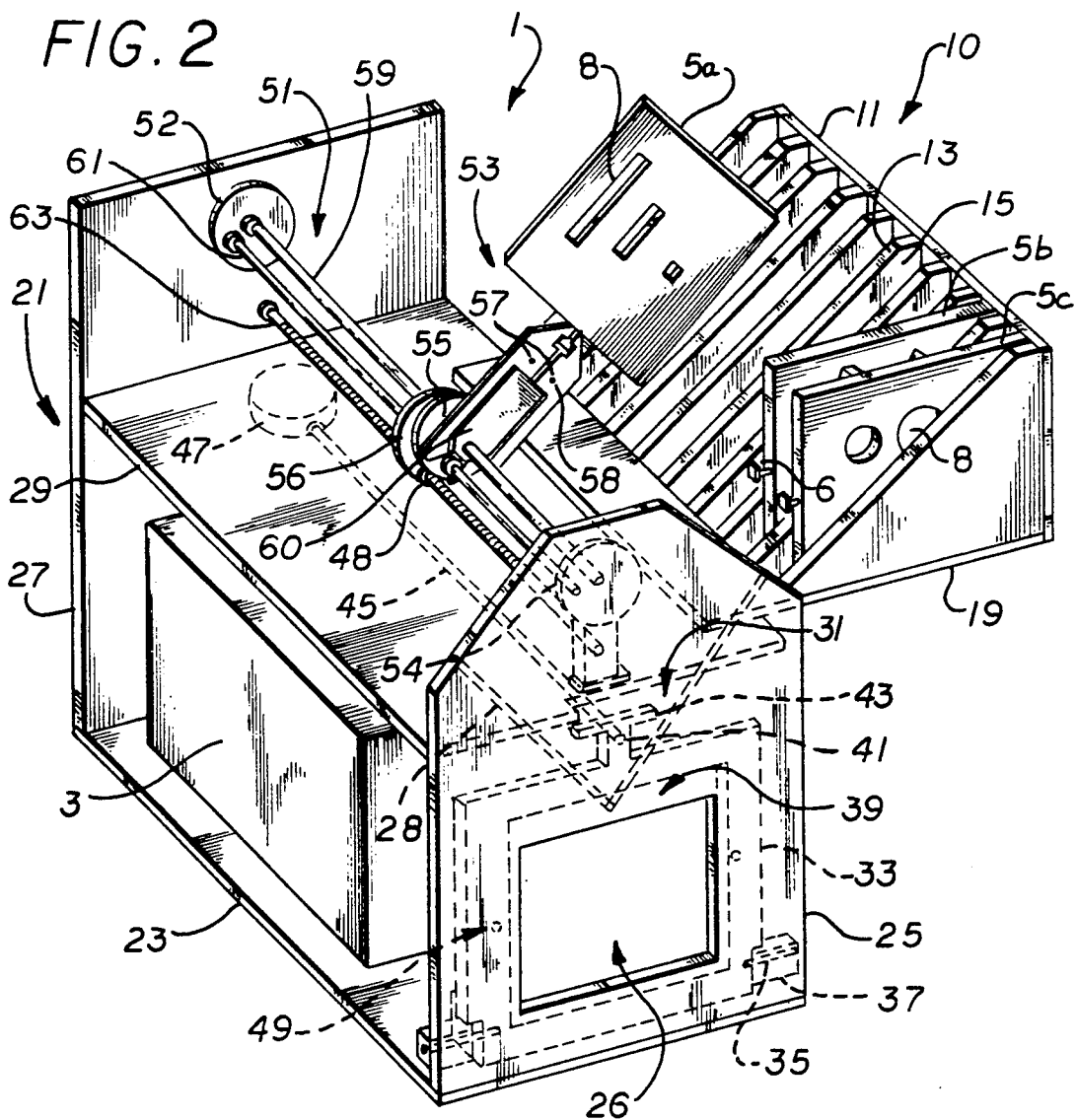

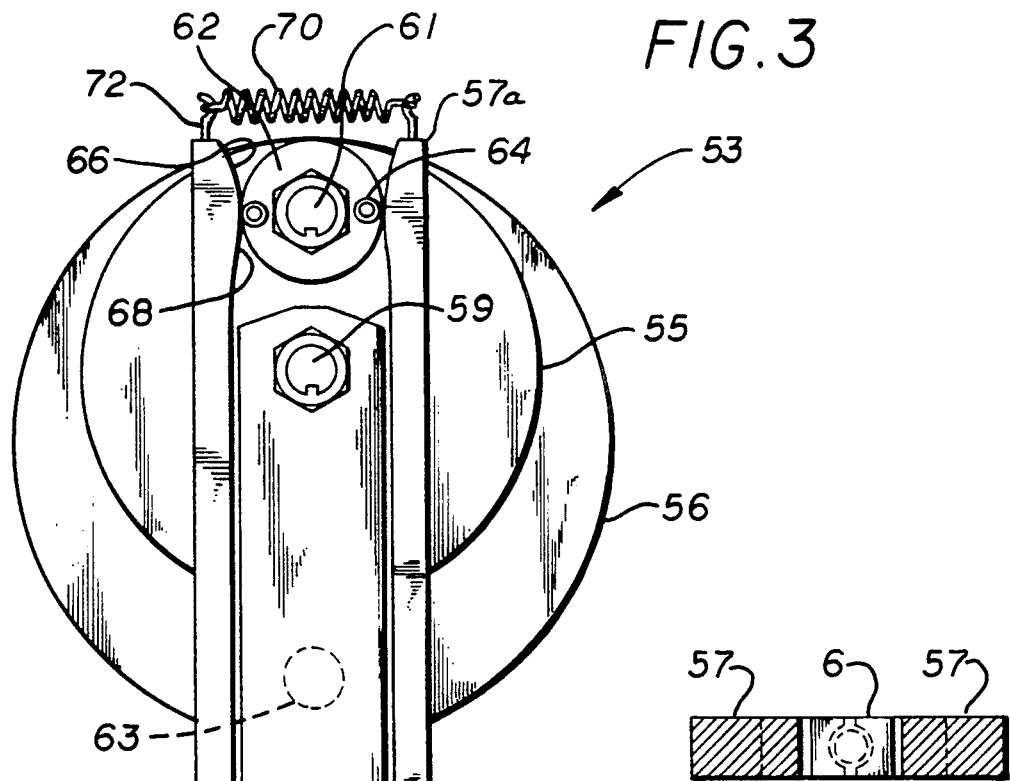
FIG. 3
FIG. 4
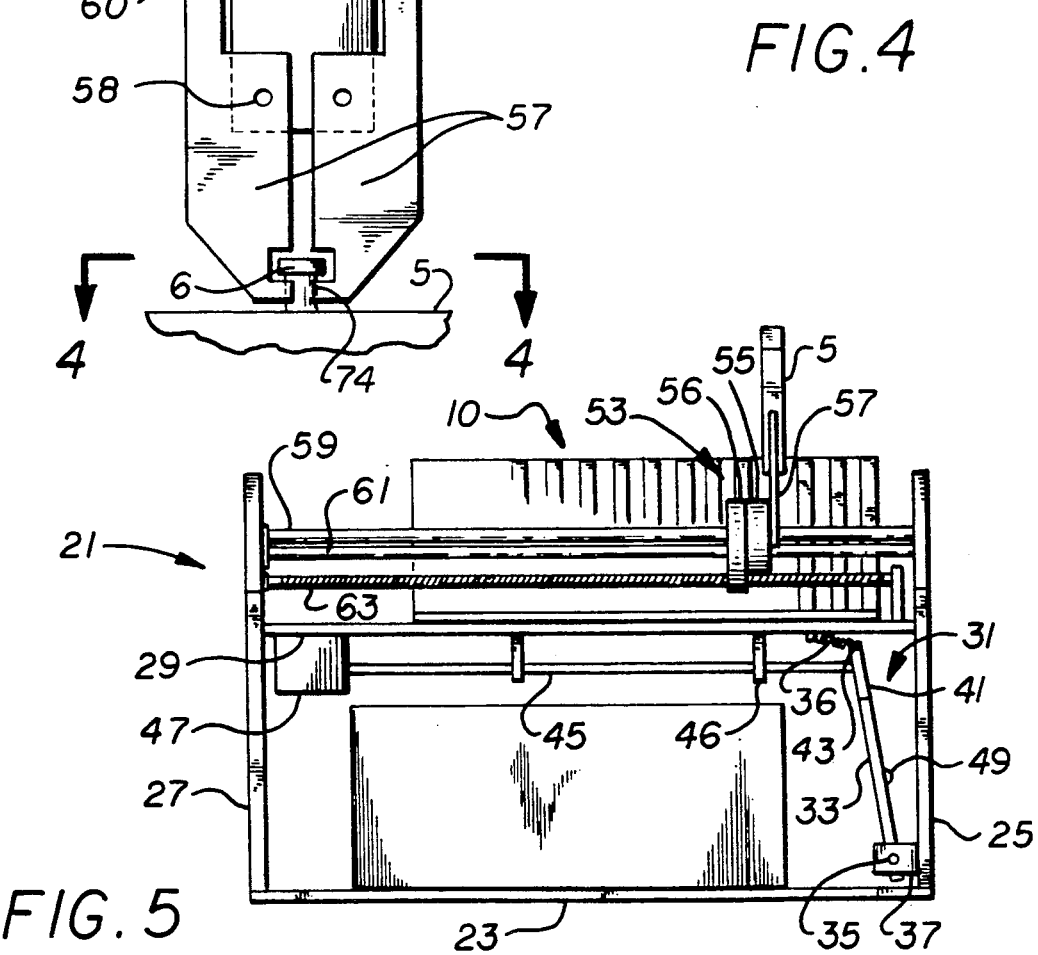
FIG. 5

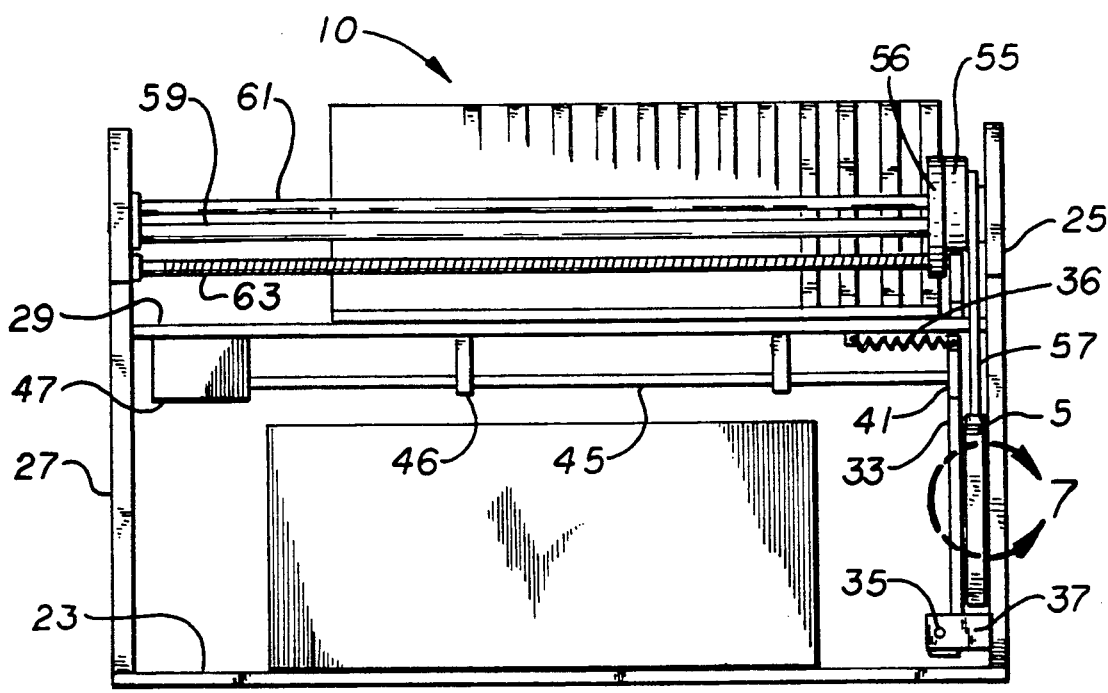
FIG. 6
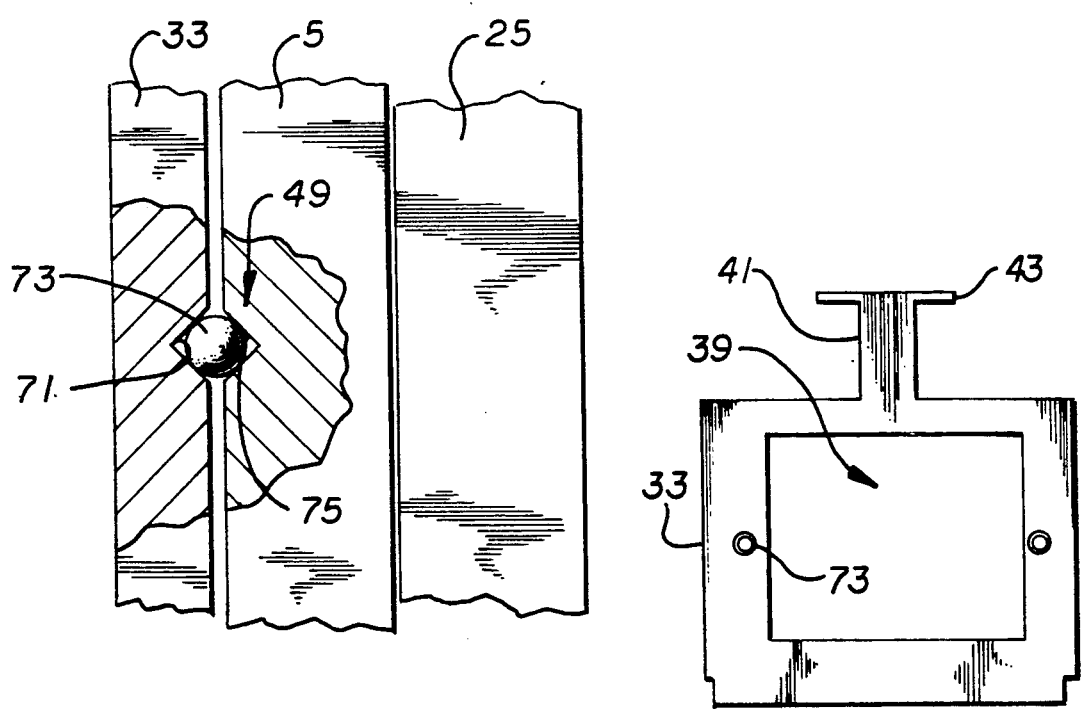
FIG. 7
FIG. 8

INFRARED TARGET PLATE HANDLING APPARATUS WITH IMPROVED THERMAL CONTROL

BACKGROUND OF THE INVENTION

1. Field of the Invention

This invention relates to the field of thermal measurement devices, and in particular to a target placement apparatus for placing targets at the objective plane in an infrared sensitivity tester or calibrator.

2. Brief Discussion of the Prior Art

Heat detecting instruments are widely known and are becoming even more popular as technology advances to produce instruments capable of detecting slight temperature differences between objects at a considerable distance from the sensor. An example of such a device is the infrared camera which is sensitive to the emission of infrared radiation from bodies, such emission varying dependent, inter alia, upon the size and temperature of a body emitting the radiation. There are a variety of types of devices for which the temperature sensing sensitivity or its minimum resolvable temperature characteristics are desired to be known. For the sake of simplicity in this description, it will be presumed that the instrument needing analysis of its sensitivity or minimum resolvable temperature is an infrared camera which focuses upon a target in an objective plane and produces an image and/or a data transmission representative of the temperature profile at the objective plane. It will be understood, however, that this invention is not limited to the measurement or calibration of infrared cameras and would apply equally well to any of a number of infrared imaging devices.

It is common practice in the art of calibrating infrared cameras, and the like, to position a target plate at the objective plane of the camera and emit heat from a heat source through apertures in the target plate, directed to the camera lens, while maintaining a highly controlled temperature differential between the target plate and the heat source. By maintaining a precise and selectable temperature difference between the heat source and the target plate and calculating the apparent angular size of the apertures in the target plate as seen by the camera, the minimum resolvable temperature difference (MRTD) as a function of resolution element size can be determined. As a result, the maximum sensitivity of the camera can be established as characteristic of that particular camera. The MRTD of an infrared camera is an important parameter for certain intended uses; it is defined as Parameter 100 by MIL-STD-1859 entitled Thermal Imaging Devices, Performance Parameters Of. For example, if the infrared camera is used to detect vehicles at a distance, the smaller the camera's MRTD, the greater the ability of the camera to resolve the existence of a vehicle at greater distances.

Of course, for the same camera, the MRTD will be smaller for larger objects and larger for smaller objects. Accordingly, a more sophisticated parameter to characterize the capabilities of an infrared camera is the modulation transfer function (MTF). MTF is defined in Parameter 102 of MIL-STD-1859, Optical Transfer Function (OTF), as the modulus of the OTF. It can be calculated from MRTD measurements taken at multiple spatial frequencies.

These are the measurements that are needed to be made in this field of art. To accomplish this, there must be a heat source that is controlled differentially with respect to a target plate normally held at ambient temperature, although the target plate could be at a controlled temperature different from ambient. The object, then, is to measure and control the temperature difference ($\Delta T$) and analyze the camera output under such controlled conditions.

Accordingly, the target plate should be uniform in temperature, and its temperature must be able to be measured critically. Normally, a platinum resistance thermometer (PRT) or other thermal sensor is placed on the source, and another thermal sensor is placed on the target plate. The temperature difference between the two sensors is then tightly controlled differentially by known thermoelectric techniques. The source is thermoelectrically controlled by a solid state heater/refrigerator such that the temperature of the source can be varied from colder than the target plate to hotter than the target plate, thereby creating either positive or negative contrast relative to the opaque or closed portions of the target plate as viewed by the infrared camera. That is, the source is either hotter than the target plate or colder than the target plate.

The source is typically an aluminum plate which is thermally controlled, and is often referred to in the art as a black body heat source.

In the interest of accuracy, it is essential to maintain the temperature of the target plate relative to the heat source in a tightly controlled manner, and further to keep the target plate from being influenced by its surroundings to the greatest extent possible. Moreover, with greater and greater sensitivities being designed into infrared cameras, the problem of measuring and maintaining the temperature of the target plate precisely and to keep the target plate free from environmental influences that can affect either the temperature of the plate or the distribution of temperature across the plate, becomes more acute. Obviously, a non-uniform temperature plate is also a source of error in measuring and/or calibrating infrared imaging devices.

One way of placing the target plate in the objective plane of an infrared camera is by manual manipulation. However, since the target plate is bound to be influenced by handling and by the proximity of the heat source, and since the slots in the target plate are often thousandths of an inch in width, the mass of the target plate is insufficient to maintain a stable temperature relative to the heat source when measuring MRT at high frequency. Accordingly, in manually placing the target plates into position, an operator would screw the edges of the target plate to a larger mass framework by means of a number of bolts and nuts around the periphery of the target plate.

There are several problems associated with such manual manipulation of the target plates, among which are easy exposure to damage by simply handling the target plates and by the tools necessary to mount the target plate to the framework. Further, the oils from the skin of the operator's hands can significantly affect the emissivity of the contaminated surface (causing cold spots) and render inaccurate readings in the infrared imaging system being analyzed. Finally, since it is often necessary to change target plates, either to select a different shape of aperture therein or to mask the heat source with slots of different dimensions representing different sized targets or targets at different distances, the manual manipulation methodology becomes burdensome, clumsy, and time consuming and results in inappropriate confidence levels in the measurements.

To overcome the difficulties associated with manual manipulation of target plates, target wheels have been used that rotate about an axle and have peripheral positions for many different target plates which can be selectively brought into the objective plane of the infrared camera in a rather quick manner.

However, even this arrangement has many drawbacks. First, as target plates become larger and larger, the size of the target wheel gets to be an impractical size. For example, for a three inch diameter target, a twenty-six inch wheel would be required to accurately index twelve targets plates into position on a selective basis. When the measurement/ calibration equipment is needed to be on site, for example in an aircraft or motor vehicle, the size of the target wheel precludes the interchange possibility of using larger targets, and therefore the ability to quickly interchange the target plates is lost. In such environments, the manual manipulation process must be used. An additional problem with the target wheel is that, as indicated previously, it is necessary to keep the target plate from changing its temperature, to the extent possible, due to the proximity of the heat source. While a target wheel is or can be rather massive to provide temperature stability for the selected target plate, there are obvious limitations as to how much mass the wheel can have and yet be operable with reasonably sized components. If a target plate in one position of the wheel is exposed to the heat source for any length of time, its temperature is raised. Since the adjacent targets are thermally coupled through the mass of the wheel, they too are influenced, as a temperature gradient is established across portions of the wheel around the selected target, again leading to measurement inaccuracies.

Yet another drawback of target wheels is that, since each selected target plate is, to some degree, thermally isolated from its surroundings, each target plate must be provided with a separate temperature sensor. This leads to inaccuracies, in that temperature sensors are very individual and unique in their thermal/electronic parameters, and thus calibration of each of the sensors becomes costly, burdensome, very time consuming, and some tolerance can be expected between targets even after calibration.

There is therefore a need in the art for a target placement apparatus which can quickly and easily position a target plate at the objective plane of an infrared imaging device, which is small in size and weight, which can quickly and repeatedly position a selected target plate in the exact same position, and which can quickly and reliably thermally couple the target plate to a window framework without manually screwing the target plate to the framework. The present invention provides a practical solution to the aforementioned problems and offers the stated benefits.

SUMMARY OF THE INVENTION

In accordance with the invention there is provided a target placement apparatus having the facility to select targets with apertures of various sizes and monitor their temperature by pressing them against a framework. In a practical application of the invention, the apparatus is adapted to place targets at the objective plane in an infrared sensitivity tester or calibrator, the apparatus comprising a storage means for storing a plurality of target plates, preferably soaking at ambient temperature, and a mechanical arrangement for removing a selecting one of the target plates from the storage means and precisely placing it at the objective plane. Preferably, the storage means is a magazine-like storage rack and stores a number of target plates in a face-to-face relationship.

The arrangement for removing a selected target plate from storage and placing it in the proper position includes a movable mechanical arm having a simplified wrist action which positively and reliably operates to remove a selected target plate from the storage means and swing the target plate into an indexed position within a window area of a surrounding high mass framework.

The invention includes a receiver for receiving a selected target plate generally at the objective plane, the receiver including a frame structure having an opening therein to expose at least the central portion of the target plate, thereby defining the aforementioned window area. The apparatus may further include means for positioning the selected target plate, received in the receiver, at a repeatably precise location at the objective plane. Preferably, the means for positioning the selected target plate comprises a pressure plate for applying pressure on the target plate and thereby forcing the target plate against the frame structure. A detent mechanism is provided for acting between the pressure plate and the target plate for accurately aligning and indexing the selected target plate at the objective plane.

The positioning means further includes a hinge arrangement for pivotally mounting the pressure plate at one of its edges adjacent the receiver, and a ram for applying pressure to the edge of the pressure plate opposite the hinged edge, whereby, when the selected target plate is placed in the receiver generally at the objective plane, the ram is operative to apply pressure to the pressure plate opposite edge, and engage the detent between the pressure plate and target plate to force the target plate to its repeatably precise position against the frame structure.

The invention thus avoids all of the problems associated with prior art manual manipulating methods and target wheel arrangements, in that: the magazine-like storage unit occupies less volume and is much smaller in physical dimensions than the prior art target wheel; the target plates can be kept very close to room temperature in the storage magazine, as they are substantially thermally isolated from one another in the storage rack; the target plates can be fully mechanically manipulated from the storage rack to the receiving area without any human handling, to reduce wear and accidental damage to the target plate as well as contamination caused by human handling; the target plates can be quickly and positively indexed using relatively low mass mechanical components as compared with that of a target wheel arrangement; a single temperature sensor, positioned in the framework against which the selected target plate is pressed, can be used to simplify temperature calibration; and the target plates can be precisely and repeatably indexed at the receiving area without time-consuming and complex bolting procedures.

BRIEF DESCRIPTION OF THE DRAWING

The invention will now be described with more particularity having reference to the accompanying drawings in which:

FIG. 1 shows the basic arrangement of a heat source, target plate, and infrared imaging device which is basic to both the prior art and the present invention;

FIG. 2 is a perspective drawing showing the invention with a target plate removed from the storage rack and in a suspended position prior to its insertion into a receiving area;

FIG. 3 is an elevation view of the wrist mechanism which is operative to manipulate the target plates as they are removed from storage, positioned at the objective plane, and returned to storage;

FIG. 4 is a cross-sectional view taken along the Lines 4—4 in FIG. 3;

FIG. 5 is a side elevation view showing the invention in a part of its operating cycle at which the target plate has been removed from the storage rack and has not yet been inserted in the receiving area;

FIG. 6 is a view similar to that of FIG. 5, except that the target plate has been inserted into the receiving area, and the ram has indexed the target plate into its proper position;

FIG. 7 shows a partial cross-sectional enlarged view of the area shown by the circle 7—7 in FIG. 6 and illustrates the indexing mechanism; and FIG. 8 is a view of the pressure plate which is used to force the target plate into its indexed position.

DETAILED DESCRIPTION OF THE PREFERRED EMBODIMENTS

FIG. 1 illustrates a basic set-up by which a measurement or calibration arrangement 1 comprises a heat source 3 and a slotted target plate 5. An infrared imaging device 7, hereinafter referred to as an infrared camera, has its optics 9 axially aligned with the direction of infrared emission from the heat source 3, and by the aforementioned procedures, various thermal sensitivity characteristics of the camera 7 can be measured, evaluated, and/or calibrated. In order to be properly focused on the image plane within camera 7, the target plate 5 must be placed at the objective plane P of the camera so that the apertures 8 in target plate 5 are in focus for the camera.

In FIG. 2, a perspective view of the target placement apparatus according to the invention is illustrated, again referenced in general by the arrow of reference numeral 1. The heat source 3 is shown schematically in the bottom of the target placement apparatus 1, and targets 5a, 5b and 5c are illustrated with target plate 5a in the extracted position and target plates 5b and 5c in the stored position in a target plate magazine or rack 10.

In the discussion of FIG. 2 which follows, reference is also made to FIGS. 5 and 6 in which certain features are better depicted.

Rack 10 has a rear wall 11 and slanted divider walls 13 defining spaces 15 for receiving the target plates 5 and storing them at ambient temperature. Each target plate has a stud 6 projecting from the inner edge thereof for manipulation. The bottom plate 19 of the rack 10 is extended to mount by known means to the top of a shelf 29 which is part of the main frame structure 21. Structure 21 has a bottom 23, a front wall support 25, and a rear wall support 27, all elements making up the main frame structure 21 being of heavy, strong metal material, the front wall support 25, in particular, being required to have a good thermal conductivity characteristic for purposes that will be discussed later.

At the front of shelf 29 is a cutout which defines a target receiving slot 31 where the target plates 5 can be swung down and into position relative to the open window 26 in a target plate receiving portion of the front wall support 25.

Positioned behind the front wall support 25, and spaced therefrom, is a pressure plate 33 which is pivotally mounted to the base 23 by means of a hinge pin 35 operatively connected between a cutout at the bottom of pressure plate 33 and a hinge block 37 positioned on either side of pressure plate 33. Mounted in this manner, the pressure plate 33 can pivot about hinge pins 35 away from the front wall support 25 to define a receiving area for the selected target plate 5 between the pressure plate 33 and the front wall support 25. An opening 39 in the pressure plate 33 is preferably slightly larger than the window 26 in the main frame front wall support 25. Dimensionally, it is necessary for each side of the opening 39 to be smaller than the corresponding sides of target plate 5, such that the pressure plate 33 can apply force against target plate 5 and press the target plate against the inside wall of the front wall support 25 and into good thermal coupling therewith. The slots or apertures 8 in target plate 5 will then be exposed through both the opening 39 and window 26.

Pressure plate 33 is provided with a neck portion 41 at its upper edge which terminates at a cross piece 43 in the form of a pair of ears extending laterally on each side of the neck 41. In its resting state, the pressure plate is pulled toward the rear of the structure 21 by means of a pair of springs 36 best seen in FIGS. 5 and 6. The other ends of springs 36 are affixed to the bottom of shelf 29, and the springs, being tension springs, pull the top of pressure plate 33 rearwardly.

The purpose of the neck portion 41 of pressure plate 33 is to provide a pressure point for the exertion of the end of a ram rod 45 which is driven by a ram driver 47 mounted at the rear of the structure 21. When power is applied to the ram driver 47, the ram rod 45 moves forwardly applying pressure to neck 41 and, in turn, presses a target plate 5, sandwiched between the pressure plate 33 and front wall support 25, into substantial thermal coupling with the inner surface of front wall support 25. The ram is constructed to provide about 200 pounds of force against the target plate.

A detent and ball combination 49, acting as an indexing mechanism between the pressure plate 33 and the target plate 5, will be explained later in connection with FIG. 7.

The operatively active part of the invention, which may be generally described as a wrist 53, is mounted on a movable bearing assembly 55 capable of both rotating and moving axially on the series of shafts 51.

A pair of jaws 57 are pivotally mounted on a jaw plate 60 which, in turn, is fixed to the movable bearing assembly 55.

Proper operation of the wrist 53 requires rotation of the jaws 57, opening and closing of jaws 57, and axial translation of the jaws across the entire length of the storage rack 10 and to a position where the jaws are capable of being rotated to move the target plate 5 through slot 31 and into position between pressure plate 33 and front wall support 25.

For rotational movement of the wrist 53, a jaw-rotating spline shaft 59 is provided extending the length of the structure 21. As the shaft 59 rotates, so does the movable bearing assembly 55 which is keyed to the spline shaft 59. Shaft 59 is capable, by its driving source, to rotate in either direction clockwise or counterclockwise (as looking from the front of the unit).

A jaw operating shaft 61, also a splined shaft, operates to allow the ends of jaws 57 to come together or to move apart in order to grab onto or release the studs 6 on a selected or deselected target plate, respectively. The functioning of the jaw will be discussed in connection with FIG. 3.

In order to translate the wrist 53 longitudinally of the structure 21, a lead screw 63, with a tight lead, is provided. Lead screw 61 is supported by bearings at each of its ends and driven by a motor of appropriate known design. The central portion of lead screw 63 passes through an idler nut 48 which has internal threads mating with the external threads of the lead screw 63. Idler nut 48 is fixed to a translator 56 shown as a metallic circular plate axially fixed to movable bearing assembly 55, with movable bearing assembly 55 being rotatable with respect thereto. In such an arrangement, the turning of lead 63 forces the idler nut 48 to follow the threads of the lead screw and translate translator 56 longitudinally.

Since movable bearing assembly 55 is axially affixed to translator 56, it likewise moves longitudinally along with translator 56. However, when shaft 59 rotates to swing the jaws 57, movable bearing assembly 55 rotates along with it, being keyed to the spline shaft 59. Translator 56 is not keyed to shaft 59, thereby permitting the shaft 59 to rotate relative thereto and not exert any rotational forces against translator 56.

Turning now to FIG. 3, an elevational view of the wrist 53 is shown with a target plate 5 in the received position, i.e. between pressure plate 33 and front support wall 25 (cf FIG. 2). As explained, jaw plate 60 is keyed to jaw rotating shaft 59 and therefore rotates with it. The jaws are therefore capable of being rotated in either angular direction by an appropriate reversible motor (not shown) which may be mounted rearwardly of the rear support wall 27. Of course, as splined shaft 59 rotates, so does jaw plate 60 affixed thereto, and through the connection of the jaws 57 to jaw plate 60 by means of pivot pins 58, the jaws likewise are rotatably positioned at the desired angle.

To operate the jaws, i.e. to open and close them, splined operating shaft 61 carries a spline bearing 62 keyed to the shaft 61. Movable bearing assembly 55 is not, however, keyed to spline shaft 61, so that shaft 61 only rotates spline bearing 62 when operated. The spline bearing 62 carries a pair of oppositely positioned radial bearings 64 which press against cam surfaces 66, 68 formed at the extremities of the rear ends of jaws 57. The slopes on the cam surfaces 66, 68 are equal, so that, as splined bearing 62 rotates, one radial bearing 64 slides down its corresponding cam surface (e.g. 66), while the other radial bearing 64 slides down the other cam surface (e.g. 68).

The jaws 57 are shown in the closed position in FIG. 3, since the radial bearings 64 ride at the peak between the two cammed surfaces 66, 68. This action forces the free ends 57a of jaws 57 to spread apart, and, due to the pivoting action about pivot points 58, the jaws 57 themselves come together as viewed in the drawing. In order to force the jaws 57 apart, when the shaft 61 rotates and permits the radial bearings 64 to slide down their respective cammed surfaces 66, 68, a tension spring 70, connected to posts 72 at the free ends 57a of the jaws 57, forces the jaws 57 apart, so that the operation of radial bearings 64 is such as to always work against the tension of spring 70.

FIG. 4 shows the view taken along the Lines 4—4 in FIG. 3 to illustrate that the head of the stud 6 is rectangular. This is important from a security viewpoint, since it is essential not to allow the target plates 5 to rotate relative to the jaws when being transported. Additional security is provided by the tips 74 of jaws 57, which, in the closed position of the jaws, embrace the shaft of the stud 6 as shown in dotted lines in FIGS. 3 and 4. This will preclude the jaws from sliding laterally of the selected target plate once the target plate is grasped by the jaws 57.

It is to be understood that the embodiment of the invention shown in FIGS. 2, 5, and 6 show, for convenience, a certain number of target storage pockets 15. A preferred embodiment of the invention would have twelve pockets 15, although the invention could be modified to provide storage magazines 10 on each side of the structure 21, so that the unit can accept 24, or more, target plates for quick and easy selection and placement in the receiving area. Only obvious mechanical modifications would be necessary, together with the appropriate changes in the computer/electronics which operate the unit automatically (not shown).

In FIG. 5, a target plate 5 has just been selected and raised slightly by wrist 53. In this figure, the operation of the lead screw 63, its bearings, and translator 56 can better be appreciated. Also, the placement of the spring 36 at the ears 34 of pressure plate 33, as well as the manner of pivoting the bottom of pressure plate 33 is better seen in this figure and in FIG. 6. Finally, the placement of the ram 45 and ram drive 47 is better understood. In the preferred embodiment of the invention, a ram rod enclosed in a casing and fitted just under the bottom surface of the shelf 29 would be employed. The rather crude ram rod construction shown in the drawing is intended to aid the reader in understanding the functioning of the invention, not necessarily to represent the most aesthetic or mechanically superior arrangement.

Also seen in FIG. 5 is the position of the detent and ball combination 49, again to be discussed more fully in connection with FIG. 7.

Prior to retrieving the stored target plate 5 in FIG. 5, the jaws 57 would have been positioned horizontally, and the wrist assembly 53 would have translated horizontally with the studs 6 of each target plate passing through the opening at the ends of open jaws 57, until the jaws 57 are adjacent the appropriate target plate to be selected and the jaw tips are surrounding the respective stud 6. Jaw operating shaft 61 then rotates, as hereinbefore explained, to close the jaws about stud 6, rotate the target plate 5 upwardly, and begin translating the target plate forwardly of the structure 21 by the operation of lead screw 63, until the target plate 5 is above the target receiving slot 31. At this point, the lead screw is stopped, and the jaw rotating shaft 59 is rotated to swing the jaws 57 and attached target plate 5 through target receiving slot 31 and between pressure plate 33 and front wall support 25. This position is shown in FIG. 6.

At this point, the ram drive 47 is energized to extend ram rod 45 to press against neck 41 of pressure plate 33 causing pressure plate 33 to rotate about end 35 and stretch tension spring 36, all such operation serving to press the selected target plate against the front wall support 25 for good thermal coupling therebetween.

Not shown in the drawing are the various motors and motor control circuitry, preferably assisted by a computer, as these devices can be assembled and interconnected to provide the necessary driving forces and timing using rather standard components and electronic circuitry.

FIG. 7 shows a partial cross-sectional view of the center portion of the receiving area shown by arrows 7—7 in FIG. 6. In order to provide both an extremely large amount of force to press target 5 against wall 25, and to positively and precisely position the target plate in a repeatable position each time a target is selected, the detent and ball combination 49 is shown to comprise a ball bearing 73 captured in a ball bearing socket 71 in pressure plate 33. A V-shaped notch 75 is provided in each target plate 5, and all such construction is duplicated on both sides of the pressure plate 33 and target plate 5, respectively. This type of construction is known in the industry as a C'SINK device.

By providing a ball 73 and designing the depth of the notch 75 such that the walls of notch 75 contact ball 73 before target plate contacts the surface of the pressure plate 33, there is no possibility that the pressure plate 33 can contact target 5 and upset the thermal characteristics thereof. The only contact is the small area between the periphery of the ball 73 and the surface of recess 75, and any errors this small thermal contact would introduce are quite tolerable.

Since the hinge assembly 35, 37 can be constructed of reasonably tight tolerance construction, the position of the ball 73 in the position shown in FIG. 7 is exactly duplicated each time the ram 45 pushes pressure plate 33 to its closed position. In this manner, the target plate 5 will be exactly positioned, and this repeatability of the positioning of the target plates is extremely important as was explained earlier in this description.

Another quality of the pressure plate 33 is that it is thinned at its upper portion, i.e. above the detent and ball combination 49. In this way, the ram 45 can apply a significant amount of pressure against the neck 41 and cause the upper portion of pressure plate 33 to bend, as illustrated in FIG. 7, still without causing pressure plate 33 to contact target plate 5. The amount of pressure that can be applied by this arrangement will exceed 200 pounds on the target plate. Obviously, such high pressure is conducive to the aforementioned precise repeatable alignment and indexing of the target plate and establishes extremely good thermal coupling between the selected target plate 5 and the wall 25.

Yet a further aspect of the pressure plate concerns its construction, being of stainless steel which is known to be a poor heat conductor. Accordingly, the pressure plate acts as a heat shield for the target plate and the portion of wall 25 that would otherwise be exposed to the heat of the heat source 3. This will be better appreciated by realizing that sometimes it is important to have temperature differentials between the target plate and the heat source of as much as 100° C. The simplified arrangement of the detent and ball combination 49 precludes the necessity of bolting the target plate to the wall 25, prevents large surface contact between the pressure plate 33 and target plate 5, and shields the sensitive area around the target plate 5, none of which features have been achievable by prior art techniques and construction.

To aid in thermally decoupling a selected target from all influences except the front wall support 25, tetrafluoroethylene bushings are used to the maximum extent possible, and especially for mounting the jaws 57 and jaw plate 60 to the movable bearing assembly 55.

In order to preclude the need for a separate temperature sensor in each target plate 5, a single thermal sensor can be placed in one of the wells 28 drilled diagonally within the front wall support 25, as seen in FIG. 2. Because of the large pressure applied to press the selected target plate 5 against the wall 25, the target plate 5 and wall 25 will come to thermal equilibrium in a brief period of time, so that sensing the temperature of wall 25 immediately adjacent window 26 will provide very accurate temperature sensing of the target plate itself. By virtue of the fact that the target plate 5 is pressed against the front wall support 25 under hundreds of pounds of pressure, both pieces being relatively massive and of a metal having good thermal conductivity (e.g. aluminum), this essentially insures that the target plate 5 and wall 25 are at the same temperature. Accuracy can be assured even further by the provision of two wells 28, one for receiving an insertable calibrated reference sensor and the other for the operating, constant monitoring, thermal sensor. When a reference sensor is not used, a plug is inserted into the unused empty well 28.

Of course, a temperature sensor could be inserted into a well (not shown) in each target plate if desired. However, this would require calibration of each sensor in each target plate (e.g., for 12 plates) since each sensor has its own individual characteristics in its environment. Additionally, because the calibration instrument would have to connect to each sensor when the target plate is in place, some form of connector with contacts would have to be used, and it is well known that wire connections, spring fingers, and the like are a source of noise and errors or inaccurate measurement results due to corrosion or variation in resistance normally experienced in such connections. This would not be acceptable in instruments intended to be sensitive to temperature control errors on the order of 0.001° C., as is the case using the present invention. Alternatively, radiometric temperature measurement of the target plate, in position, is possible as well, but this is expensive and would be done only on a custom basis.

FIG. 8 shows the configuration of the pressure plate in better detail.

It will be appreciated that a specific embodiment, with some slight alternative mechanical constructions, has been described in connection with the target placement apparatus of this invention. It will also be obvious that many modifications of the construction can be made without departing from the spirit and scope of the invention, and it is therefore to be understood that this invention is not limited to the specific arrangement described and shown herein but is to be limited only by the appendant claims.

I claim:

1. A target placement apparatus for placing targets at the objective plane in an infrared sensitivity tester/calibrator, comprising:
   storage means for storing a plurality of target plates;
   means mounted adjacent said storage means for removing a selected one of said targets plates from said storage means and placing it at said objective plane, and for removing said selected target plate from said objective plane and returning said selected target plate back to said storage means.

2. The target placement apparatus as claimed in claim 1, comprising:
   means for receiving a target plate generally at said objective plane, said means for receiving including a frame structure having an opening therein to expose the central portion of said target plate; and means for positioning said selected target plate, received in said receiving means, at a repeatably precise location at said objective plane.

3. The target placement apparatus as claimed in claim 2, wherein said positioning means comprises:

a pressure plate for applying pressure on said target plate and thereby press said target plate against said frame structure.

4. The apparatus as claimed in claim 3, wherein said positioning means comprises:

detent means acting between said pressure plate and said target plate for accurately aligning and indexing said selected target plate at said objective plane.

5. The target placement apparatus as claimed in claim 3, wherein said positioning means comprises:

hinge means for pivotally mounting said pressure plate at one of its edges adjacent said receiving means; and a ram for applying pressure at the edge of said pressure plate opposite said one edge; whereby when said selected target plate is placed in said receiving means generally at said objective plane, said ram is operative to apply pressure to said pressure plate opposite edge to engage said detent between said pressure plate and said target plate to force said target plate to its repeatably precise position against said frame structure.

6. The apparatus as claimed in claim 1, wherein:

each of said target plates has a projecting stud on one of its edges; and said means for removing and placing comprises a pair of rotatable jaws, said jaws including means for securely grasping one of said projecting studs and manipulating the target plate associated with said stud.

7. The apparatus as claimed in claim 6, comprising:

a movable bearing assembly;

first shaft means for rotating said movable bearing assembly keyed thereto;

means for mounting said jaws to said movable bearing assembly such that said jaws rotate with rotation of said first shaft means and said movable bearing; and pivot means for pivotally mounting said pair of jaws relative to each other on said movable bearing assembly.

8. The apparatus as claimed in claim 7, comprising:

a translator member coupled to said movable bearing for translating said movable bearing axially of said first shaft means, said movable bearing being rotatable relative to said translator means; and second shaft means for translating said translator member.

9. The apparatus as claimed in claim 8, wherein:

said translator member has an internally threaded opening therein; and said second shaft means includes a lead screw passing through said threaded opening and operatively connected thereto, said translator member, and said movable bearing assembly, being transported axially of said lead screw and axially of said first shaft means by the lead screw action of said lead screw within said threaded opening.

10. The apparatus as claimed in claim 9, comprising:

a third shaft means passing through said movable bearing assembly;

a rotatable radial bearing means keyed to said third shaft means;

cam means at the rear ends of said jaws, said rear ends being extensions of said jaws extending rearwardly, whereby upon rotation of said third shaft means, said radial bearing means cams said cam means to selectively spread said jaw rear ends apart and permit said jaw rear ends to come together, said pivot means pivoting said jaws relative to said movable bearing assembly between said jaws and said jaw rear ends; and resilient means tending to spread said jaws apart and said jaw rear ends together, whereby the outwardly directed camming of said jaw rear ends by said radial bearing means moves said jaws together against the action of said resilient means.

11. The apparatus as claimed in claim 5, wherein:

said positioning means includes spring means attached between said frame structure and a point on said pressure plate remote from said one edge; and said ram works against the spring force of said spring means.

12. The apparatus as claimed in claim 5, wherein:

said pressure plate includes a neck portion projecting from said opposite edge against which said ram applies pressure.

13. The apparatus as claimed in claim 4, wherein said positioning means comprises:

hinge means for pivotally mounting said pressure plate at one of its edges adjacent said receiving means; and a ram for applying pressure at the edge of said pressure plate opposite said one edge; whereby when said selected target plate is placed in said receiving means generally at said objective plane, said ram is operative to apply pressure to said pressure plate opposite edge to engage said detent between said pressure plate and said target plate to force said target plate to its repeatably precise pressed position against said frame structure.

14. The apparatus as claimed in claim 13, wherein:

said detent means is located intermediate said one edge and said opposite edge of said pressure plate; and a portion of said pressure plate above said detent means is thinned relative to the portion below said detent means.

15. The apparatus as claimed in claim 14, wherein the thinned portion of said pressure plate is defined by a narrowing or tapering of said pressure plate toward said opposite edge.

16. The apparatus as claimed in claim 4, wherein said detent means comprises a ball socket, and a ball captured therein, on one of said pressure plate and each said target plate, and a shallow spherical depression on the other of said pressure plate and each said target plate.

17. The apparatus as claimed in claim 16, wherein the distance which said ball projects from the surface containing said ball socket is greater than the depth of said shallow spherical depression, such that the facing surfaces of said pressure plate and a target plate received in said receiving means are prevented from touching even after the application of pressure on said target plate by said pressure plate when said target plate is pressed against said frame structure.

18. In an infrared target placement means, the improvement comprising:

a heat source for emitting thermal radiation;

means for selectively maintaining said heat source at a preselected temperature in a predetermined temperature range;

a magazine means, said magazine means containing a plurality of individually positionable target plates;

frame means in thermal radiation receiving relationship to said heat source, said frame means having a target plate receiving portion in a predetermined location receiving said thermal radiation from said source;

target plate handling means mounted in said frame means for selectively removing individually each of said target plates from said magazine means and positioning the selected target plate in said receiving portion of said frame means, and removing said selected target plate from said frame means and returning the selected target plate to said magazine, each of said target plates having at least one aperture therethrough in alignment with said heat source, whereby thermal radiation from said heat source is transmitted through said at least one aperture;

pressure plate means mounted on said frame means for selectively retaining said selected target plate at said receiving portion of said frame means for the condition of said target plate means on said frame means at said receiving portion thereof;

means for detecting the temperature of said target plate; and means for comparing the temperature of said target plate with the temperature of said heat source.

19. The apparatus as claimed in claim 18, comprising:
means for receiving a target plate generally at said receiving portion of said frame means, said means for receiving including a frame structure having an opening therein to expose the central portion of said target plate; and means for indexing said selected target plate, received in said receiving means, at a repeatably precise location at said objective plane.

20. The apparatus as claimed in claim 19, wherein said indexing means comprises:
a pressure plate for applying pressure on said selected target plate and thereby press said target plate against said frame structure.

21. The apparatus as claimed in claim 20, wherein said indexing means comprises:
detent means acting between said pressure plate and said selected target plate for accurately aligning and indexing said selected target plate in said receiving means.

22. The apparatus as claimed in claim 20, wherein said indexing means comprises:
hinge means for pivotally mounting said pressure plate at one of its edges adjacent said receiving means; and a ram for applying pressure at the edge of said pressure plate opposite said one edge; whereby when said selected target plate is placed in said receiving means, said ram is operative to apply pressure to said pressure plate opposite edge to engage said detent between said pressure plate and said target plate to force said target plate to its repeatably precise position against said frame structure.

23. The apparatus as claimed in claim 18, wherein:
each of said target plates has a projecting stud on one of its edges; and said means for removing, positioning, and returning comprises a pair of rotatable jaws, said jaws including means for securely grasping one of said projecting studs and manipulating the target plate associated with said stud.

24. The apparatus as claimed in claim 23, comprising:
a movable bearing assembly;

first shaft means for rotating said movable bearing assembly keyed thereto;

means for mounting said jaws to said movable bearing assembly such that said jaws rotate with rotation of said first shaft means and said movable bearing; and pivot means for pivotally mounting said pair of jaws relative to each other on said movable bearing assembly.

25. The apparatus as claimed in claim 24, comprising:
a translator member coupled to said movable bearing for translating said movable bearing axially of said first shaft means, said movable bearing being rotatable relative to said translator means; and second shaft means for translating said translator member.

* * * * *